Sept. 18, 1951  S. J. POPLAWSKI  2,568,300
ICE CREAM DISHER
Filed June 14, 1946
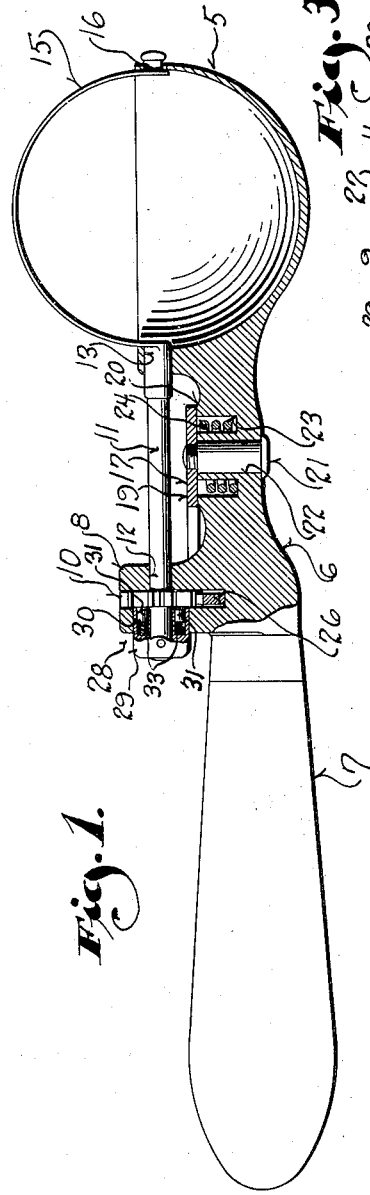
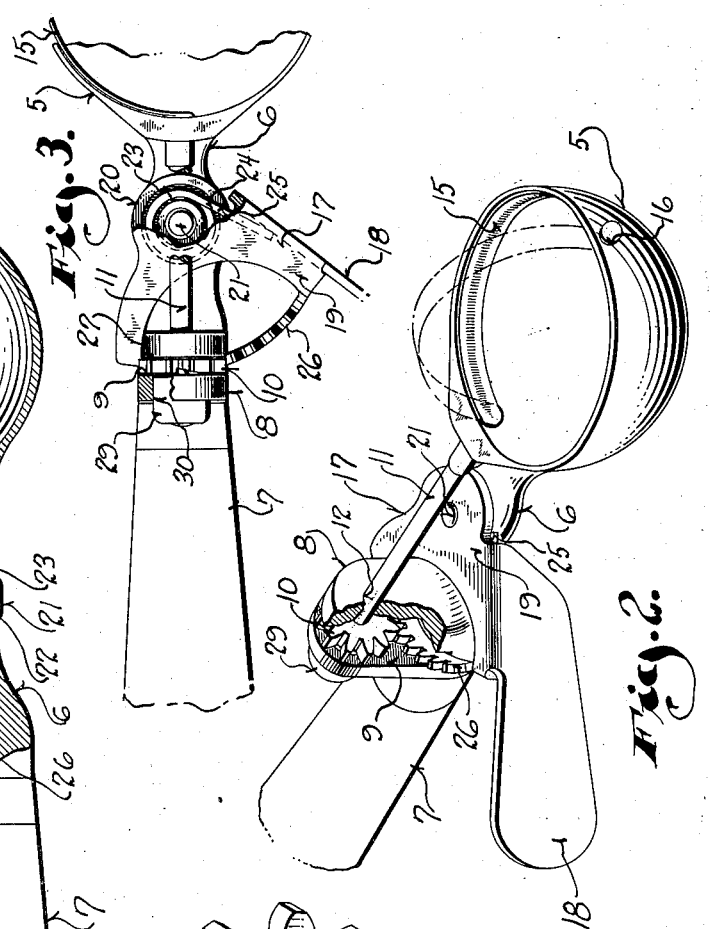
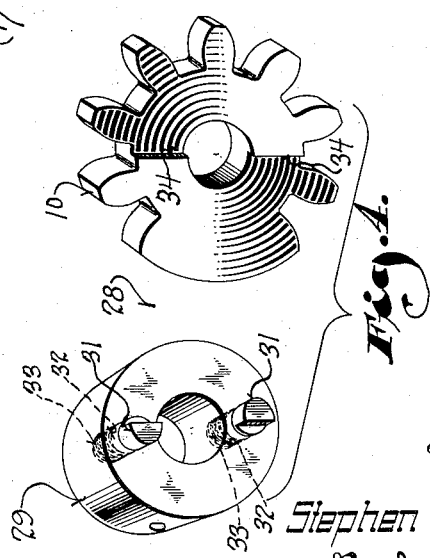
Inventor
Stephen J. Poplawski Patented Sept. 18, 1951

2,568,300

UNITED STATES PATENT OFFICE 2,568,300

ICE-CREAM DISHER

Stephen J. Poplawski, Racine, Wis., assignor to John Oster Manufacturing Company, Racine, Wis., a corporation of Wisconsin Application June 14, 1946, Serial No. 676,641

3 Claims. (Cl. 107—48)

This invention relates to certain new and useful improvements in ice cream dishers and has as a general object to provide a disher of simplified and inexpensive construction.

With this general object in view, this invention contemplates as another object the provision of a disher in which the bowl and shank are formed as an integral unit.

It is a further object of this invention to provide means for removing excess cream from the edges of the bowl, which means is actuated by the same mechanism employed to release the ball of cream from the bowl.

More specifically, it is an object of this invention to provide an ice cream disher having a scraper rotatable in the bowl in the usual manner and also adapted to be swung in an arc across the open top of the bowl so as to shear off any cream projecting beyond the sides of the bowl.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a view partially in side elevation and partially in longitudinal section, of an ice cream disher embodying this invention, the scraper being shown in the act of being swung across the top of the bowl;

Figure 2 is a perspective view of the disher with a part thereof broken away to illustrate structural details;

Figure 3 is a fragmentary top plan view; and

Figure 4 is a detail perspective view of the pinion and ratchet mechanism employed to obtain the desired operation of the scraper.

Referring now more specifically to the accompanying drawing in which like numerals indicate like parts throughout the several views, the numeral 5 represents the bowl of the disher, which is preferably hemispherical, and from which a handle shank 6 extends, the shank and bowl being one integral die casting. A handle 7 is secured to the shank 6 in any desired manner.

Cleanliness demands that the bowl of the disher be formed of metal resistant to corrosion. Hence it has been the practice heretofore to form the bowl of German silver, either nickel or chromium plated, and to form the shank of brass or other suitable less expensive metal, the bowl being brazed or otherwise attached to the shank. This sectional construction of the disher was responsible for a substantial portion of the manufacturing cost, but heretofore, unitary construction of the bowl and shank was not considered feasible because of its practically prohibitive cost.

This objection is entirely overcome by the present invention, wherein the bowl and shank are cast as an integral unit of an inexpensive alloy which has all of the essential properties. This alloy consists of aluminum, ninety-four per cent, copper four per cent, and the balance chromium and bolybdenum. It has a very pleasing appearance, requires no plating, and is particularly well suited to die casting. Also, it will not corrode under conditions of ice cream disher use. Consequently, by employing this metal, it is possible to cast the entire bowl and shank as one integral unit as illustrated.

The shank is provided with a lug 8 adjacent to the handle 7, bifurcated as at 9 for the reception of a pinion 10, which is mounted on a shaft 11. The shaft 11 is journalled in a bore 12 formed in the inner section of the lug 8 and in a bore 13 adjacent to the bowl. Attached to the shaft 11 is a semi-circular scraper 15, the outer end of which is journalled in the bowl diametrically opposite the bore 13, as at 16.

The scraper 15 is of a size and shape to conform to and wipe the inner wall of the bowl as it is rotated to loosen the cream from the walls of the bowl. The shaft 11 having the semi-circular scraper attached thereto is coaxially aligned with the hemispherical bowl 5. Thus, the bores 13 and 16 forming the journals for the shaft 11 and the outer end of the scraper 15, respectively, are substantially concentric with an axis of the hemispherical bowl.

Pivotally mounted on the shank intermediate the bowl and the lug 8 is an actuating lever 17 having a finger engaging part 18 and a flat wall 19 overlying the top face of a central boss 20 formed as part of the shank. A pivot pin 21 passed upwardly through an opening 22 in the boss 20 is threaded into the wall 19 of the actuating lever to pivotally mount the lever.

The boss 20 is provided with a chamber 23 concentric to the pin 21, which is closed by the top wall 19. In this chamber 23 is a spring 24, the inner end of which is anchored to the shank in any suitable manner. The outer end of the spring projects through an opening in the side wall of the chamber to engage the finger engaging part 18 of the lever as at 25.

Carried by the actuating lever 17 is an arcuate rack 26 concentric to the pivot pin 21 and disposed in the bifurcation of the lug beneath and meshing with the pinion 10. Actuation of the lever 17 about its pivot 21 thus imparts rotation to the pinion 10. The lever is held in a normal inoperative extended position by the spring 24, actuation of the lever by the spring being limited by the engagement of a lever part 27 with the lug 8.

Heretofore, the pinion was fastened directly to the scraper shaft so that the scraper oscillated through one hundred and eighty degrees from one side of the bowl to the other. In the present invention, however, the pinion 10 is not fastened to the shaft 11, but is drivingly connected thereto through a ratchet mechanism indicated generally by the numeral 28, whereby, instead of but one hundred and eighty degrees of oscillation, the scraper is carried through a complete circle by two successive operations of the lever 17. The purpose of this additional motion of the scraper is to cut off any excess cream which may project beyond the sides of the bowl and which is objectionable especially when the cream is to be placed in a cone.

The specific construction of the ratchet mechanism 28 comprises a head 29, pinned or otherwise fastened to the shaft 11, with the inner end thereof journalled in a bore 30 in the outer section of the lug 8 to have its inner end disposed adjacent to the pinion 10. The head 29 carries two diametrically opposite plungers 31 slidably mounted in parallel bores 32 and yieldably urged by springs 33 to project their outer ends toward the pinion. The extremities of the plungers 31 are formed as ratchets for engagement with diametrically opposite teeth 34 formed on the adjacent face of the pinion 10.

Consequently, as the pinion is driven by the arcuate rack of the actuating lever, it imparts a uni-directional rotation to the head 29 and consequently the scraper shaft. The degree of motion of the actuating lever is sufficient to turn the pinion through one hundred and eighty degrees upon a single stroke, so that each actuation of the lever 17 carries the scraper through half its motion.

In operation the ice cream is scooped up into the bowl in the customary manner with the scraper at the forward edge of the bowl as shown in Figure 2. After the bowl has been filled, the actuator lever is depressed to carry the scraper up and over the top of the bowl to cut off any excess cream which may project beyond the sides of the bowl. This action, of course, is performed without removing the disher from above the ice cream container. Then, after such excess cream has been removed, the actuator is again depressed to carry the scraper through the other one hundred and eighty degrees of rotation to perform its normal function of loosening the ice cream from the bowl.

It will be apparent that the provision of this added function of the scraper greatly facilitates the placing of the ice cream in a cone, and if desired, a complete ball or sphere of ice cream may be formed merely by packing a sufficient amount of cream above the top of the bowl and then actuating the scraper throughout its three hundred and sixty degrees of rotation.

From the foregoing description taken in connection with the accompanying drawing, it will be readily apparent to those skilled in the art, that this invention provides a definite improvement in ice cream dishers and that by reason of the unitary construction of the bowl and shank, a substantial saving is effected in the cost of manufacture. Also it will be clear that the invention may be used to serve other food besides ice cream, as for instance, mashed potatoes.

What I claim as my invention is:

1. An ice cream server comprising: a substantially hemispherical bowl; a handle secured to the bowl at one side thereof; a rotatable shaft carried by the handle coaxially with the bowl and having one end projecting toward and received in an aperture in the wall of the bowl; an arcuate scraper cooperable with and shaped to conform to the inner surface of the bowl; means connecting the scraper with said end of the shaft with the opposite ends of the scraper inside the bowl and on the shaft axis so that one full revolution of the shaft carries the scraper through 360° of movement with part of said movement allotted to travel of the scraper across the open top of the bowl and the remainder of said movement comprising a wiping stroke during which the scraper wipes across the inner face of the bowl; a manually operable actuating lever having an arcuate rack formed thereon pivotally mounted on the handle and having a predetermined range of motion; means yieldingly urging said lever to one of its limits of motion; and a unidirectional driving connection between the lever and the shaft including a pinion having cam surfaces forming tooth projections on one side thereof mounted on the shaft and constrained to rotation thereon, said pinion cooperable with said arcuate rack and operable by movement of said actuating lever, and a head fixed to said shaft having yieldingly urged plungers mounted therein cooperable with said tooth projections by which actuation of the lever through said predetermined range of motion imparts rotation to the shaft.

2. In a device of the character described: an open topped bowl adapted to contain material; an arcuate scraper; pivotal connections between the opposite ends of the scraper and the bowl at diametrically opposite points on the wall of the bowl and adjacent to the open top thereof, said pivotal connections enabling the scraper to turn through 360° with one half of said motion allotted to travel of the scraper entirely across the open top of the bowl, and the remaining half of said motion comprising a wiping stroke whereby the scraper travels across the inner surfaces of the bowl; means for rotating said scraper in one direction by 180° stages comprising a lever pivotally mounted to swing on an axis fixed with respect to the bowl and having a predetermined distance of travel; a shaft rotatable on the turning axis of the scraper and fixed to said scraper to impart rotation thereto; and means connecting said lever with the shaft including a rack carried by said lever, a pinion meshing with the rack constrained to rotation on said shaft and having tooth projections on one surface thereof, and a unidirectional driving connection between the pinion and the shaft comprising a head fixed to the shaft having spring urged plungers therein cooperable with said tooth projections whereby swinging of said lever in one direction through said predetermined distance rotates the shaft to carry the scraper through one half of its complete motion and so that two successive operations of the lever are required to rotate the shaft 360°.

3. An ice cream server comprising: a substantially hemispherical bowl; a handle secured to the bowl at one side thereof having a laterally projecting bifurcated shank portion thereon; a rotatable shaft carried by the handle coaxially with the bowl having one end projecting toward and received in an aperture in the wall of the bowl and its other end passing through an aperture in said shank bridging the bifurcation thereof; a scraper conforming to the inner contour of the bowl and journalled therein for rotation on an axis coaxial with said rotatable shaft and fixed with relation to the bowl, said scraper being adapted for swinging movement across the open top of the bowl and also adapted to wipe across the inner walls of the bowl; means connecting one end of the scraper with the end of the shaft received in the aperture in the bowl; a manually operated actuating member having an arcuate rack portion disposed within the bifurcated shank of the handle; means mounting said actuating member on the handle for back and forth movement of the arcuate rack between defined limits; and means including a pinion having two cam surfaces forming tooth projections on one side thereof mounted on the portion of the shaft bridging said bifurcation and constrained to rotation on said shaft, said pinion cooperable with said arcuate rack and operable by movement of said actuating lever, and a head fixed to said shaft having yieldingly urged plungers mounted therein cooperable with said tooth projections for translating back and forth actuation of said actuating member into rotation of the shaft the extent necessary to swing the scraper a full 360° whereby the scraper may be first swung across the entire open top of the bowl to remove excess material from the sides of the bowl by a first single full depression of said actuating member and subsequently swung across the entire interior of the bowl to scrape material from the inner sides thereof by a second full depression of said actuating member.

STEPHEN J. POPLAWSKI.

REFERENCES CITED

The following references are of record in the file of this patent:

UNITED STATES PATENTS

| Number | Name | Date |
|---|---|---|
| 953,901 | Daniel | Apr. 5, 1910 |
| 1,057,027 | Barber | Mar. 25, 1913 |
| 1,062,940 | Wilson et al. | May 27, 1913 |
| 1,121,489 | Fuqua | Dec. 15, 1914 |
| 1,296,745 | Bluhm | Mar. 11, 1919 |
| 1,615,939 | Flegel | Feb. 1, 1927 |
| 1,657,470 | Holmes | Jan. 31, 1928 |
| 1,850,517 | Russell | Mar. 22, 1932 |
| 1,862,527 | Cox | June 14, 1932 |
| 1,877,935 | Millo | Sept. 20, 1932 |
| 2,160,023 | Kelly | May 30, 1939 |